United States Patent Office 3,329,682
Patented July 4, 1967

3,329,682
7,8-DIHYDRO-3′,4′-DISUBSTITUTED CYCLO-HEXENO-(1′,2′:14,8)-CODEINONES
Kenneth W. Bentley, Willerby, England, assignor to Reckitt & Sons Limited, Dansom Lane, England, a British company
No Drawing. Filed July 7, 1965, Ser. No. 470,249
Claims priority, application Great Britain, July 8, 1964, 28,156/64
11 Claims. (Cl. 260—285)

The invention relates to novel derivatives of codeine and morphine and to processes for their manufacture.

More particularly, the present invention provides compounds of the formula

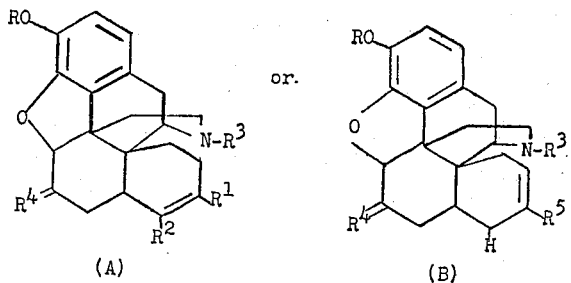

wherein

R represents a hydrogen atom or a methyl group,
$R^1$ represents a methyl, ethyl, propyl or aryl group,
$R^2$ represents a hydrogen atom, an alicyclic group with 4, 5 or 6 carbon atoms, an aryl or tetrahydrofurano group, an alkyl or alkenyl group containing up to 7 carbon atoms, or an alkyl or alkenyl group containing up to 7 carbon atoms substituted on any of carbon atoms 1 to 4 by an alicyclic, aryl, alkoxy, aryloxy, morpholino or tetrahydrofurano group, provided that $R^2$ represents a hydrogen atom only when $R^1$ represents an aryl group,
$R^3$ represents an alkyl or alkenyl group with up to about 8 carbon atoms, optionally substituted on carbon atoms 1 to 5 by an alkyl, aryl, alicyclic or heterocyclic group.
$R^4$ represents a single oxygen atom forming part of a carbonyl group or a hydrogen atom and an oxygen atom forming part of a secondary alcoholic group or a derivative thereof, and
$R^5$ represents an aryl group, and salts of bases of the above formulae with pharmaceutically acceptable acids.

The compounds of the invention are therapeutically useful on account of their power to affect the central nervous system, particularly on account of their depressant, analgesic, sedative, antitussive and/or transquilizing effects.

The present invention also includes a process for the preparation of the novel compounds of the invention in which $R^4$ is an oxygen atom wherein an alcohol of the structure:

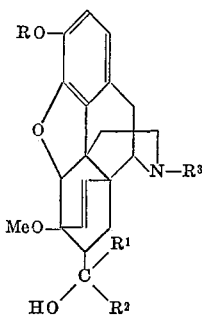

in which R, $R^1$, $R^2$ and $R^3$ have the meanings given above is heated with 5–10 N hydrochloric acid, or if R is a hydrogen atom, by heating an alcohol of the structure given above in which R is a methyl group with concentrated hydrobromic acid.

Compounds of this structure are described in British Patents 925,723, 937,214 and 969,263.

The invention also includes a process for the preparation of bases of the structure given above, in which $R^4$ represents a hydrogen atom and a hydroxyl group, wherein the ketonic bases in which $R^4$ is a single oxygen atom are reduced with sodium borohydride or other complex hydride.

The invention further includes a process for the preparation of bases of the structures given in which the group $R^3$ is other than hydrogen, wherein the bases in which $R^3$ is hydrogen are heated with the corresponding halide $R^3Cl$, $R^3Br$ or $R^3I$, and also a process for the preparation of such bases in which $R^4$ is a hydrogen atom and a hydroxyl group wherein the secondary base is acylated with an acid halide and the resulting amide reduced with lithium aluminum hydride.

The compounds according to the invention have a basic skeleton that has not previously been described in the literature. One compound according to the invention is shown here in order to illustrate the nomenclature and the numbering of the various substituents

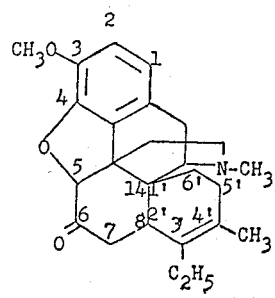

7,8-dihydro-3′ - ethyl - 4′ - methylcyclohex - 3′ - eno-(1′,2′:14,8)-codeinone.

The compounds according to the invention were originally ascribed the erroneous structure:

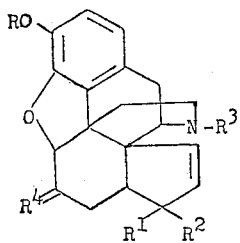

(D)

wherein R, $R^1$, $R^2$, $R^3$ and $R^4$ have the meanings given above, the cyclopenteno ring being formed by the following rearrangement;

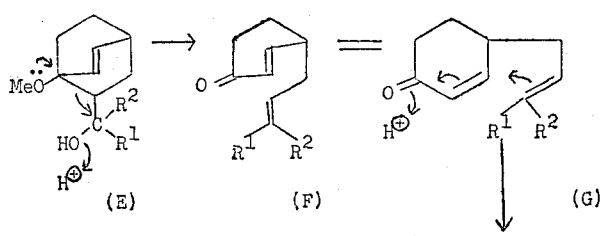

(E)  (F)  (G)

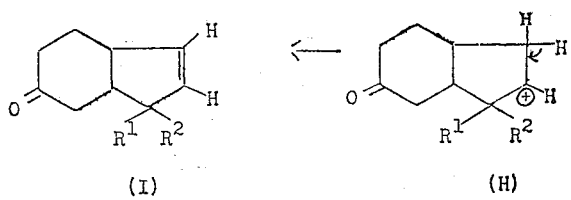

(I)  (H)

However, extensive spectral studies have revealed the necessity of revision of these structures, and in particular nuclear magnetic resonance studies have revealed that the bases do not contain the system —CH=CH—. Only the bases derived from the methyl aryl carbinols, containing the system

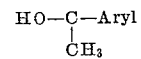

contain a double bond bearing any hydrogen and this is present as the system —CH=C—Aryl.

The acid catalyzed rearrangement of the alcohols is now seen to involve a proton addition-abstraction equilibrium between the alkenylcodeinones (K) and (M) by way of the protonated intermediate (L). This is shown in the following sequence:

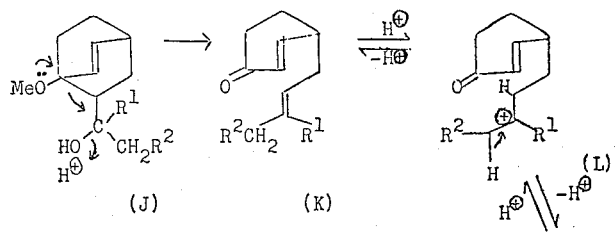

(J)  (K)  (L)

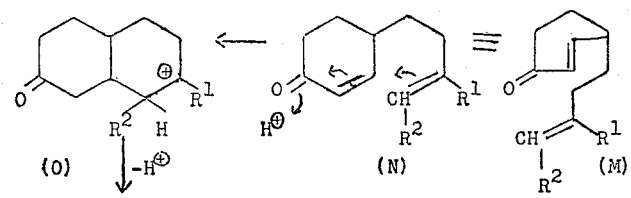

(O)  (N)  (M)

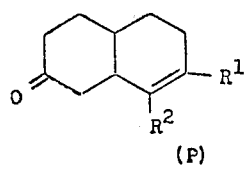

(P)

The subsequent cyclization of (M)≡(N) to (P) is essentially the same process as was originally envisaged in the cyclization of (G) to (I) and presumably steric factors favor formation of the six-membered ring rather than a five-membered ring.

It may be noted that, in the case where $R^2$ is a hydrogen atom and $R^1$ a methyl group, the rearrangement proceeds only as far as the alkenylcodeinone (K), in which the favored position of the double bond in the alkenyl side-chain is as shown. Where $R^2=R^1=$methyl, however, hyperconjugation effects make the codeinone (M) the favored form and cyclization to the end product (P) can be accomplished. In only one group of compounds does a methyl group participate in the proton addition-extraction equilibrium $(K) \rightleftarrows (L) \rightleftarrows (M)$, namely where $R^2=H$ and $R^1=$an aryl group and in this case an appreciable quantity of both isomers (K) and (M) presumably exists at equilibrium, (M) being selectively removed by cyclization to (P).

From these results it becomes a simple matter to determine the nature of the final product of rearrangement of a particular alcohol:

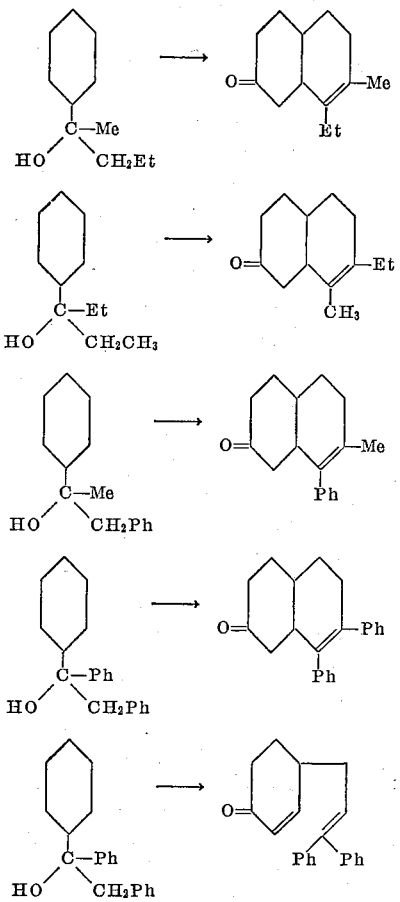

It will also be noted that the group $CH_2R^2$ in the initial alcohol is essential for this rearrangement to proceed as shown above. In the case of, for example, the cyclohexyl carbinol (Q) rearrangement of this type could give only the ketone (V) and the analogous cyclopentyl and isopropyl carbinols could only behave in this way. However, in these cases steric factors apparently prevent the sequence;

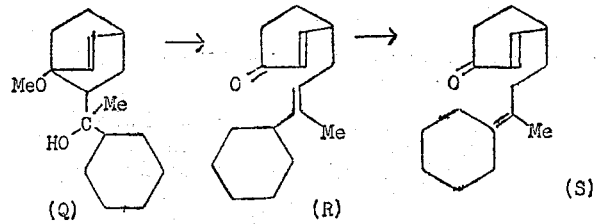

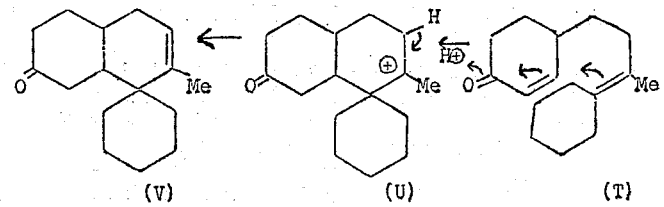

involving the formation of the six-membered ring with the gem-disubstituted carbon atom, and alcohols of this type either rearrange only as far as the 14-substituted codeinone or undergo simple dehydration without ring opening.

In the case where the carbonium ion (O) has $R^2=H$ and $R^1=$aryl, loss of a proton in the direction shown in (O) is not specially favored by hyperconjugation effects as it is in all the other cases, with the result that such carbonium ions lose a proton in both possible ways, giving rise to bases having double bonds in both possible positions, i.e. having both possible structures (A) and (B).

The invention is further illustrated by the following examples in which parts are parts by weight.

EXAMPLE 1

7,8-dihydro-3'-methyl-4'-methylcyclohex-3'-eno
(1',2':14,8)-codeinone 6,14-endoetheno-7-(2-hydroxy - 2 - butyl)-tetrahydrothebaine (10 parts) was heated on a water bath for 2 hours with 5 N hydrochloric acid and the mixture was cooled and diluted with water. The sparingly soluble hydrochloride (M.P. 284° C.) was collected and dissolved in aqueous ethanol, from which solution the base, M.P. 196° C. (8 parts) was precipitated with sodium hydroxide. It was obtained as white prisms (M.P. 199° C., $\nu$ max. 1725 cm.$^{-1}$) on recrystallization from ethanol. Found: C, 76.1%; H, 7.9%. $C_{24}H_{29}O_3N$ requires: C, 76.0%; H, 7.7%.

EXAMPLE 2

7,8-dihydro-3'-methyl-4'-methylcyclohex-3'-eno
(1,2':14,8)-codeine

The base from Example 1 (5 parts) was reduced with sodium borohydride (0.5 part) in ethanolic solution. The product was precipitated from solution by the addition of water and, when collected and recrystallized from aqueous ethanol, it had M.P. 143° C. Found: C, 72.0%; H, 8.4%. $C_{24}H_{31}O_3N.H_2O$ requires: C, 72.2%; H, 8.3%.

EXAMPLE 3

7,8-dihydro-3'-ethyl-4'-methylcyclohex-3'-eno
(1',2':14,8)-codeinone 6,14-endoetheno-7-(2-hydroxy - 2 - pentyl)-tetrahydrothebaine (10 parts) was heated on a water bath for 2 hours with 5 N hydrochloric acid. The mixture was cooled and diluted with water and the hydrochloride (M.P 282° C.) was collected. It was dissolved in aqueous ethanol and neutralized with ammonia. The precipitated base (8 parts) was recrystallized from ethanol and was obtained as white prisms, M.P. 229° C., $\nu$ max. 1730 cm.$^{-1}$. Found: C, 76.3%; H, 8.0%. $C_{25}H_{31}O_3N$ requires: C, 76.4%; H, 8.0%.

EXAMPLE 4

*7,8-dihydro-3'-ethyl-4'-methylcyclohex-3'-eno (1',2':14,8)-codeine*

The base from Example 3 (5 parts) was reduced with sodium borohydride (0.8 part) in hot ethanol. The product (5 parts) was precipitated with water, collected and recrystallized from aqueous ethanol, and was obtained as white needles, M.P. 166° C. Found: C, 75.7%; H, 8.4%. $C_{25}H_{33}O_3N$ requires: C, 76.1%, H, 8.4%.

EXAMPLE 5

*7,8-dihydro-3'-ethyl-4'-methylcyclohex-3'-eno (1',2':14,8)-norcodeinone*

6,14-endoetheno-7-(2-hydroxy-2-pentyl)-tetrahydronorthebaine (5 parts) was heated at 100° C. with 5 N hydrochloric acid for 2 hours. The resulting hydrochloride (M.P. 300° C.) gave the base (3.5 parts) when treated with ammonia. After recrystallization from ethanol it had M.P. 210° C., $\nu$ max. 1730 cm.$^{-1}$. Found: C, 75.8%; H, 7.9%. $C_{24}H_{29}O_3N$ requires: C, 76.0%; H, 7.7%.

EXAMPLE 6

*N-allyl-7,8-dihydro-3'-ethyl-4'-methylcyclohex-3'-eno(1',2':14,8)-norcodeinone*

The base, M.P. 120° C. (found C, 75.7%; H, 8.0%. $C_{27}H_{33}O_3N.\frac{1}{2}H_2O$ requires: C, 75.7%; H, 8.0%) was prepared as described in Examples 1, 3 and 5 by the rearrangement of N-allyl-6,14-endoetheno-7-(2-hydroxy-2-pentyl)-tetrahydronorthebaine under the influence of hydrochloric acid. The hydrochloride had M.P. 246° C.

EXAMPLE 7

*7,8-dihydro-3'-ethyl-4'-methylcyclohex-3-eno (1',2':14,8)-morphinone*

(a) 6,14-endoetheno-7-(2-hydroxy-2-pentyl)-tetrahydrothebaine (5 parts) was boiled under reflux for 1 hour with concentrated aqueous hydrobromic acid, the mixture was cooled and diluted with water and the base was precipitated by ammonia. After recrystallization from aqueous 2-ethoxyethanol, it was obtained as cream colored plates of M.P. 110° C. Found: C, 73.0%; H, 8.0%. $C_{24}H_{29}O_3N.H_2O$ requires: C, 72.6%; H, 8.3%. $\nu$ max. 1730 cm.$^{-1}$. Yield 3 parts.

(b) The same material was obtained by the rearrangement of 6,14-endoetheno-7-(2-hydroxy-2-pentyl)-tetrahydrooripavine under the influence of concentrated hydrochloric acid in accordance with the general method of Example 1.

EXAMPLE 8

*7,8-dihydro-3'ethyl-4'-methylcyclohex-3-eno (1',2':14,8)-morphine*

The base of Example 7 (5 parts) was reduced with sodium borohydride (0.8 part) in hot ethanol. The base was precipitated with water, collected and recrystallized from benzene/light petroleum, when it was obtained as a white, amorphous powder. Found: C, 74.8%; H, 8.3%.

$C_{24}H_{31}O_3N$ requires: C, 75.5%; H, 8.2%.

EXAMPLE 9

*7,8-dihydro-3'-propyl-4'-methylcyclohex-3-eno (1',2':14,8)-codeinone*

This base was prepared as in Example 1 from 6,14-endoetheno-7-(2-hydroxy-2-hexyl)-tetrahydrothebaine and concentrated hydrochloric acid. On recrystallization from aqueous ethanol it was obtained as prisms of M.P. 144° C. Found: C, 76.5%; H, 8.2%. $C_{35}H_{33}O_3N$ requires: C, 76.8%; H, 8.5%. $\gamma$ max. 1730 cm.$^{-1}$. Hydrochloride M.P. 260° C.

EXAMPLE 10

*7,8-dihydro-3'-isobutyl-4'-methylcyclohex-3-eno (1'2':14,8)-codeinone*

Prepared as in Example 1 from 6,14-endoetheno-7-(2-hydroxy-5-methyl-2-hexyl)-tetrahydrothebaine and concentrated hydrochloric acid, this base was obtained as white prisms of M.P. 195° C. Found: C, 76.5%; H, 8.3%. $C_{27}H_{35}O_3N$ requires: C, 76.7%; H, 8.2%. $\gamma$ max. 1730 cm.$^{-1}$; hydrochloride M.P. 254° C.

EXAMPLE 11

*7,8-dihydro-3'-isobutyl-4'-methylcyclohex-3-eno(1',2':14,8)-codeine*

This base was obtained by the sodium borohydride reduction of the base of Example 10. On recrystallization from aqueous ethanol it was obtained as needles, M.P. 184° C. Found: C, 76.5%; H, 8.9%. $C_{27}H_{37}O_3N$ requires: C, 76.3%; H, 8.7%.

EXAMPLE 12

*N-cyano-7,8-dihydro-3'-ethyl-4'-methylcyclohex-3'-eno(1',2':14,8)-norcodeinone*

N-cyano-6,14-endoetheno-7-(2-hydroxy-2-pentyl)-tetrahydronorthebaine (12.2 g.) was treated with concentrated hydrochloric acid (85 ml.) at room temperature for 18 hours. The product was precipitated with water, collected, washed with hot ethanol and dried (10.5 g.). M.P. 277–279° C. (Found: C, 74.8; H, 7.0; N, 7.0%. $C_{25}H_{28}N_2O_3$ requires: C, 74.2; H, 7.0; N, 6.9%.) $\gamma$ max. 1730 cm.$^{-1}$.

EXAMPLE 13

*N-cyano-7,8-dihydro-3'-n-proyl-4'-methylcyclohex-3'-eno(1',2':14,8)-norcodeinone*

This was prepared from N-cyano-6,14-endoetheno-7-(2-hydroxy-2-hexyl)-tetrahydronorthebaine by the method of Example 12. The product was precipitated with water, collected, recrystallized from ethanol, washed with hot petroleum ether (B.P. 60–80° C.) and further recrystallized from ethanol. M.P. 218–219° C. (Found: C, 73.8; H, 7.1; N, 6.8%. $C_{26}H_{30}N_2O_3$ requires: C, 74.6; H, 7.2; N, 6.7%.) $\gamma$ max. 1730 cm.$^{-1}$.

EXAMPLE 14

*N-cyano-7,8-dihydro-3',4'-dimethylcyclohex-3'-eno(1',2':14,8)-norcodeinone*

This was prepared from N-cyano-6,14-endoetheno-7-(2-hydroxy-2-butyl)tetrahydronorthebaine by the method of Example 12. The product was precipitated with water, collected and recrystallized with methanol. M.P. 265–272° C. (Found: C, 73.4; H, 6.7%. $C_{24}H_{26}N_2O_3$ requires: C, 73.8; H, 6.7%.) $\gamma$ max. 1730 cm.$^{-1}$.

EXAMPLE 15

*N-cyano-7,8-dihydro-3'-n-butyl-4'-methylcyclohex-3'-eno(1',2':14,8)-norcodeinone*

This was prepared from N-cyano-6,14-endoetheno-7-(2-hydroxy-2-heptyl)-tetrahydronorthebaine by the method of Example 12. The product was precipitated with water, collected, recrystallized from ethanol and washed with hot petroleum ether (B.P. 60–80° C.). M.P. 202–205° C. (Found: C, 74.9; H, 7.4; N, 6.4%. $C_{27}H_{32}N_2O_3$ requires: C, 75.0; H, 7.5; N, 6.5%.) $\gamma$ max. 1735 cm.$^{-1}$.

EXAMPLE 16

*N-cyano-7,8-dihydro-3'-isobutyl-4'-methylcyclohex-3'-eno(1',2':14,8)-norcodeinone*

This was obtained from N-cyano-6,14-endoetheno-7-(2-hydroxy-5-methyl-2-hexyl)-tetrahydronorthebaine by the method of Example 12. The product was precipitated with water, collected, recrystallized from ethanol and washed with hot petroleum ether (B.P. 60–80° C.). M.P. 223–225° C. (Found: C, 75.0; H, 7.5; N, 6.6%. $C_{27}H_{32}N_2O_3$ requires: C, 75.0; H, 7.5; N, 6.5%.) γ max. 1730 cm.$^{-1}$.

EXAMPLE 17

*7,8-dihydro-3'-ethyl-4'-methylcyclohex-3'-eno(1',2':14,8)-norcodeinone*

The base from Example 12 (37.5 g.), water (1400 ml.), 2-ethoxyethanol (600 ml.) and potassium hydroxide (144 g.) were boiled under reflux with stirring for 18 hours. After cooling, the crude product (23.5 g.) was collected and recrystallized from aqueous ethanol. M.P. 210–215° C. (Found: C, 76.5; H, 7.8; N, 3.7%. $C_{24}H_{29}NO_3$ requires: C, 76.0; H, 7.7; N, 3.7%.) γ max. 1725 cm.$^{-1}$.

EXAMPLE 18

*7,8-dihydro-3'-n-propyl-4'-methylcyclohex-3'-eno(1',2':14,8)-norcodeinone*

The base from Example 13 (30 g.), water (840 ml.), 2-ethoxyethanol (420 ml.) and potassium hydroxide (120 g.) were boiled under reflux for 18 hours. The product was precipitated with iced water (3500 ml.) and collected. The crude nor-compound (27 g.) was used without further purification for the alkylation reactions in Examples 25, 26 and 28.

EXAMPLE 19

*N-allyl-7,8-dihydro-3'-ethyl-4'-methylcyclohex-3'-eno(1',2':14,8)-norcodeinone*

The base from Example 17 (8 g.), allyl bromide (4.8 g.), anhydrous potassium carbonate (16 g.) and acetone (250 ml.) were boiled under reflux with stirring for 18 hours. The mixture was filtered and the filtrate evaporated to dryness. Ethereal hydrogen chloride was added. The resulting hydrochloride was collected and then basified with aqueous ethanolic ammonia. The base was recrystallized from aqueous ethanol (4.9 g.). M.P. 131–133° C. (Found: C, 77.3; H, 8.0; N, 3.3%. $C_{27}H_{33}NO_3$ requires: C, 77.3; H, 7.9; N, 3.3%.) γ max. 1735 cm.$^{-1}$.

EXAMPLE 20

*N-(2-methylallyl)-7,8-dihydro-3'-ethyl-4'-methylcyclohex-3'-eno(1',2':14,8)-norcodeinone*

The base from Example 17 (5 g.), methylallyl chloride (1.5 g.), anhydrous potassium carbonate (10 g.) and methyl ethyl ketone (75 ml.) were boiled under reflux with stirring for 18 hours. The material (4 g.) obtained by filtration and evaporation contained much unreacted nor-compound and was treated further in boiling methyl ethyl ketone (75 ml.) with 2-methylallyl chloride (2.5 g.) and anhydrous potassium carbonate (10 g.) for 18 hours. The mixture was filtered, the filtrate evaporated to dryness and the product recrystallized from aqueous methanol (1.4 g.). M.P. 126–129° C. (Found: C, 77.6; H, 8.1; N, 3.2%. $C_{28}H_{35}NO_3$ requires: C, 77.6; H, 8.1; N, 3.2%.) γ max. 1730 cm.$^{-1}$.

EXAMPLE 21

*N-(3:3-dimethylallyl)-7,8-dihydro-3'-ethyl-4'-methylcyclohex-3'-eno(1',2':14,8)-norcodeinone*

This was obtained from the base from Example 17 (4.6 g.), 3:3-dimethylallyl bromide (3.2 g.), anhydrous potassium carbonate (9 g.) and acetone (100 ml.) by the method of Example 19. The product was recrystallized from aqueous ethanol. M.P. 109–113° C. (Found: C, 77.7; H, 8.4; N, 3.2%. $C_{29}H_{37}NO_3$ requires: C, 77.8; H, 8.3; N, 3.1%.) γ max. 1730 cm.$^{-1}$.

EXAMPLE 22

*N-butyl-7,8-dihydro-3'-ethyl-4'-methylcyclohex-3'-eno(1',2':14,8)-norcodeinone*

This was obtained from the base from Example 17 (2.3 g.), butyl iodide (6 g.), anhydrous potassium carbonate (5 g.) and acetone (50 ml.) by the method of Example 19. The product was purified by chromatography through an alumina column eluting with benzene petroleum ether (B.P. 60–80° C.). M.P. 123–124° C. (Found: C, 77.2; H, 8.6; N, 3.2%. $C_{28}H_{37}NO_3$ requires: C, 77.2; H, 8.6; N, 3.2%.) γ max. 1735 cm.$^{-1}$.

EXAMPLE 23

*N-hexyl-7,8-dihydro-3'-ethyl-4'-methylcyclohex-3'-eno(1',2':14,8)-norcodeinone*

This was obtained from the base from Example 17 (2 g.), hexyl bromide (5 g.), anhydrous potassium carbonate (4 g.) and acetone (50 ml.) by the method of Example 19. The product was purified by chromatography through an alumina column eluting with benzene petroleum ether (B.P. 60–80° C.). M.P. 129–131° C. (Found: C, 77.5; H, 9.0; N, 3.1%. $C_{30}H_{41}NO_3$ requires: C, 77.7; H, 8.9; N, 3.0%.) γ max. 1735 cm.$^{-1}$.

EXAMPLE 24

*N-octyl-7,8-dihydro-3'-ethyl-4'-methylcyclohex-3'-eno(1',2':14,8)-norcodeinone*

This was obtained from the base from Example 17 (4.5 g.), n-octyl bromide (11.3 g.), anhydrous potassium carbonate (9 g.) and acetone (75 ml.) by the method of Example 19. The product was purified by chromatography through an alumina column eluting with benzene petroleum ether (B.P. 60–80° C.). M.P. 103.5–104° C. (Found: C, 78.3; H, 9.3; N, 3.0%. $C_{32}H_{45}NO_3$ requires: C, 78.2; H, 9.2; N, 2.8%.) γ max. 1730 cm.$^{-1}$.

EXAMPLE 25

*N-allyl-7,8-dihydro-3'-n-propyl-4'-methylcyclohex-3'-eno(1',2':14,8)-norcodeinone*

This was obtained from the crude base from Example 18 (8 g.), allyl bromide (5 g.), anhydrous potassium carbonate (16 g.) and acetone (100 ml.) by the method of Example 19. The product was purified by chromatography through an alumina column eluting with benzene petroleum ether (B.P. 60–80° C.). M.P. approx. 60° C. (Found: C, 76.9; H, 8.1; N, 3.3%. $C_{28}H_{36}NO_3$ requires: C, 77.6; H, 8.1; N, 3.2%.) Hydrochloride M.P. 139–142° C. γ max. 1735 cm.$^{-1}$.

EXAMPLE 26

*N-(2-methylallyl)-7,8-dihydro-3'-n-propyl-4'-methylcyclohex-3'-eno(1',2':14,8)-norcodeinone*

The crude base from Example 18 (8 g.), 2-methylallyl chloride (4 g.), anhydrous potassium carbonate (16 g.) and acetone (100 ml.) were boiled under reflux for 18 hours. The material (7 g.) obtained by filtration and evaporation contained much unreacted nor-compound and was further treated with 2-methylallyl chloride (6 g.) anhydrous potassium carbonate (14 g.) and acetone (100 ml.) for 18 hours. The mixture was filtered, the filtrate evaporated to dryness and the product purified by chromatography through an alumina column eluting with benzene petroleum ether (B.P. 60–80° C.). M.P. approx. 50° C. (Found: C, 77.4; H, 8.3; N,3.2%. $C_{29}H_{37}NO_3$ requires: C, 77.8; H, 8.3; N, 3.1%.) Hydrochloric M.P. 128–132° C. γ max. 1725 cm.$^{-1}$.

EXAMPLE 27

*N-ethyl-7,8-dihydro-3'-n-propyl-4'-methylcyclohex-3'-eno(1',2':14,8)-norcodeinone*

This was obtained from the crude base from Example 18 (5 g.), ethyl iodide (5 g.), anhydrous potassium carbonate (10 g.) and acetone (50 ml.) by the method of Example 19. The product was purified by chromatography through an alumina column eluting with benzene petroleum ether (B.P. 60–80° C.). M.P. approx. 50° C. (Found: C, 76.8; H, 8.5; N, 3.5%. $C_{27}H_{35}NO_3$ requires: C, 76.9; H, 8.4; N, 3.3%.) Hydrochloride M.P. 142–145° C. $\gamma$ 1720 cm.$^{-1}$.

EXAMPLE 28

*N-propyl-7,8-dihydro-3'-n-propyl-4'-methylcyclohex-3'-eno(1',2':14,8)-norcodeinone*

This was obtained from the crude base from Example 18 (4.4 g.), propyl iodide (5 g.), anhydrous potassium carbonate (10 g.) and acetone (50 ml.) by the method of Example 19. The product was purified by chromatography through an alumina column eluting with benzene petroleum ether (B.P. 60–80° C). M.P. approx. 50° C. (Found: C, 77.3; H, 8.6; N, 3.4%. $C_{28}H_{37}NO_3$ requires: C, 77.2; H, 8.6; N, 3.2%.) Hydrochloride M.P. 140–144° C. $\gamma$ max. 1730 cm.$^{-1}$.

EXAMPLE 29

*N-allyl-7,8-dihydro-3'-isobutyl-4'-methylcyclohex-3'eno(1',2':14,8)-norcodeinone*

N-allyl-6,14-endoetheno-7-(2 - hydroxy - 5 - methyl - 2-hexyl)-tetrahydronorthebaine (3.1 g.) was treated at room temperature with concentrated hydrochloric acid (15 ml.) for 42 hours. The product was precipitated with water (50 ml.), collected, and basified with aqueous ammonia (1.9 g.). The product was purified by chromatography through an alumina column eluting with benzene petroleum ether (B.P. 60–80° C.). M. P. indefinite. Found: C, 78.3; H, 8.4; N, 3.1%. $C_{29}H_{37}NO_3$ requires: C, 77.8; H, 8.3; N, 3.1%.) Hydrochloride M.P. 140–144° C. $\gamma$ max. 1725 cm.$^{-1}$.

EXAMPLE 30

*N-ethyl-7,8-dihydro-3'-isobutyl-4'-methylcyclohex-3'-eno(1',2':14,8)-norcodeinone*

N-ethyl-6,14-endoetheno-7-(2-hydroxy - 5 - methyl - 2-hexyl)tetrahydronorthebaine hydrochloride (9 g.) was treated at room temperature with concentrated hydrochloric acid (50 ml.) for 66 hours. The mixture was diluted with water (600 ml.) and the gummy precipitate removed. The product was precipitated from the mother liquors by basification with ammonia. The product (3.5 g.) was purified by chromatography through an alumina column eluting with benzene petroleum ether (B.P. 60–80° C.). M.P. approx. 65° C. Hydrochloride M.P. 142–146° C. $\gamma$ max. 1725 cm.$^{-1}$.

EXAMPLE 31

*N-cyclopropylmethyl-7,8-dihydro-3',4'dimethylcyclohex-3'-eno(1',2':14,8)-norcodeinone*

N-cyclopropylmethyl-6,14-endoetheno-7-(2-hydroxy - 2-butyl-tetrahydronorthebaine (2.5 g.) was treated at room temperature with concentrated hydrochloric acid (25 ml.) for 66 hours. The mixture was diluted and basified, the product collected and recrystallized from aqueous methanol. M.P. 137–140° C. (Found: C, 77.7; H, 8.0; N, 3.3%. $C_{27}H_{33}NO_3$ requires: C, 77.3; H, 8.0; N, 3.3%.) $\gamma$ max. 1730 cm.$^{-1}$.

EXAMPLE 32

*N-allyl-7,8-dihydro-3'-ethyl-4'-methylcyclohex-3'-eno(1',2':14,8)-norcodeine*

A mixture of the base from Example 19 (2.9 g.), sodium borohydride (0.61 g.) and ethanol (20 ml.) was boiled for 2 hours, evaporated to dryness. The residue was taken up in cold aqueous dilute hydrochloric acid and basified with aqueous ammonia. The product (2.5 g.) was collected and purified by chromatography through an alumina column, eluting with benzene petroleum ether (B.P. 60–80° C.). M.P. approx. 45° C. (Found: C, 75.5; H, 8.3; N, 3.4%. $C_{27}H_{35}NO_3$ requires: C, 76.9; H, 8.4; N, 3.3%). No carbonyl band at approx. 1730 cm.$^{-1}$. Hydrochloride M.P. 143–145° C.

EXAMPLE 33

*N-cyclobutylmethyl-7,8-dihydro-3'-methyl-4'-methyl-cyclohex-3'-eno(1',2':14,8)-norcodeinone*

This was obtained from the base from Example 17 (4 g.), cyclobutylmethyl p-toluenesulphonate (9.6 g.), anhydrous potassium carbonate (8 g.) and methyl ethyl ketone (70 ml.) by boiling for 70 hours. The mixture was filtered and the filtrate evaporated to dryness. Ethereal hydrogen chloride was added. The resulting hydrochloride was collected and then basified with aqueous ethanolic ammonia. The product (1.8 g.) was purified by chromatography through an alumina column, eluting with benzene petroleum ether (B.P. 60–80° C.). M.P. 146–147° C. $\gamma$ max. 1730 cm.$^{-1}$.

EXAMPLE 34

*7,8-dihydro-4'-ethyl-3'-methylcyclohex-3'-eno(1',2':14,8)-codeinone*

6,14 - endoetheno - 7 - (3-hydroxy-3-pentyl)tetrahydrothebaine was heated on a water bath for 1 hour with conc. HCl. The product was obtained. The product was precipitated by basification with ammonia (sp. gr. 0.88), collected and recrystallized from ethanol. M.P. 198° C. (Found: C, 76.2; H, 8.1%. $C_{25}H_{31}NO_3$ requires: C, 76.4; H, 8.0%.) $\gamma$ max. 1730 cm.$^{-1}$.

EXAMPLE 35

*7,8-dihydro-3'-methyl-4'-phenylcyclohex-3'-eno(1',2':14,8)-codeinone*

6,14 - endoetheno - 7 - (1-hydroxy-1-phenyl-1-propyl)-tetrahydrothebaine (2 g.) was heated on a water bath for 1 hour with concentrated hydrochloric acid (50 ml.). The mixture was diluted with water. Ethanol was added to dissolve the viscous hydrochloride, and the aqueous ethanolic solution, basified with ammonia. The precipitated base was collected, washed with water and recrystallized from 2-ethoxyethanol. M.P. 224–226° C. $\gamma$ max. cm.$^{-1}$.

EXAMPLE 36

*7,8-dihydro-3'-propyl-4'-phenylcyclohex-3'-eno(1',2':14,8)-morphinone*

Prepared as in Example 35 from 6,14-endoetheno-7,(2-hydroxy-2-hexyl)-tetrahydrooripavine. M.P. 114–115° C. Hydrochloride M.P. 248–250° C. (dec.).

EXAMPLE 37

*7,8-dihydro-3'-isobutyl-4'-methylcyclohex-3'-eno(1',2':14,8)-morphinone*

Prepared as in Example 35 from 6,14-endoetheno-7-(2-hydroxy-5-methyl - 2 - hexyl) - tetrahydrooripavine. M.P. 128–129° C. Hydrochloride 265–267° C. (dec.).

EXAMPLE 38

*N-cyclopropylmethyl-7,8-dihydro-3'-isobutyl-4'-methyl-cyclohex-3'-eno(1',2':14,8)-normorphinone*

Prepared as in Example 35 from N-cyclopropylmethyl-6,14-endoetheno-7-(2-hydroxy-5-methyl - 2 - hexyl)-tetrahydronororipavine. M.P. 263° C. (dec.). Hydrochloride 288–290° C. (dec.).

EXAMPLE 39

*N-cyclopropylmethyl-7,8'-dihydro-3'-ethyl-4'-methyl-cyclohex-3'-eno(1',2':14,8)-normorphinone*

Prepared as in Example 35 from N-cyclopropymethyl-6,14 - endoetheno-7-(2-hydroxy-5-methyl-2-hexyl) - tetrahydronororipavine. Hydrochloride M.P. 185–187° C.

EXAMPLE 40

*7,8-dihydro-4'-phenylcyclohex-4'-eno(1',2':14,8)-morphinone*

Prepared as in Example 35 from 6,14-endoetheno-7,(1-hydroxy-1-phenyl-1-ethyl)-tetrahydrooripavine. M.P. 235° C. Hydrochloride 276–278° C. (dec.).

EXAMPLE 41

*7,8-dihydro-4'-phenylcyclohex-4'-eno(1',2':14,8)-codeinone and 7,8-dihydro-4'-phenylcyclohex-3'-eno(1',2':14,8)-codeinone*

6,14-endoetheno-7-(1-hydroxy-1-phenyl-1-ethyl)-tetrahydrothebaine (5 g.) was heated with concentrated hydrochloric acid (100 ml.) and ethanol (15 ml.) on the steam bath for 30 mins. The precipitate was collected, washed with cold water and dissolved in hot 50% aqueous ethanol. The resulting solution was basified with ammonia and the precipitated solid was collected and recrystallized from ethanol. Colorless plates, M.P. 149–151°. (Found: C, 78.4; H, 6.8. $C_{28}H_{29}NO_3$ requires: C, 78.6, H, 6.8%.) $\gamma$ max. 1730 cm.$^{-1}$. A sample of this product (0.363 g.) was chromatographed on a column of Merck acid washed alumina (60 g.) and developed with 200 ml. of 1% ethyl acetate in benzene. Elution with 2% (200 ml.) and 5% ethyl acetate (600 ml.) gave 29×20 ml. fractions which were examined chromatographically on thin layer plates of alumina. Separation was achieved to give 7,8-dihydro-4'-phenylcyclohex-4'-eno(1',2':14,8)-codeinone (0.204 g.), M.P. 161–163° C. after recrystallization from methanol and 7,8-dihydro-4'-phenylcyclohex-3'-eno(1',2':14,8)-codeinone (0.020 g.). M.P. 212–214° C. after recrystallization from methanol.

EXAMPLE 42

*7,8-dihydro-4'-phenylcyclohex-4'-eno(1',2':14,8)-codeine*

The mixture of isomers of the codeinone of Example 41 (M.P. 149–151° C.) was reduced with sodium borohydried (0.5 g.) in hot ethanol (200 ml.). The product was precipitated with water, collected and recrystallized four times from ethanol as white prisms. M.P. 191° C. (Found: C, 78.1; H, 7.4%. $C_{28}H_{31}NO_3$ requires: C. 78.4; H, 7.3%.) Pure by thin layer chromatography.

I claim:

1. A codeine or morphine derivative selected from compounds of the formulae

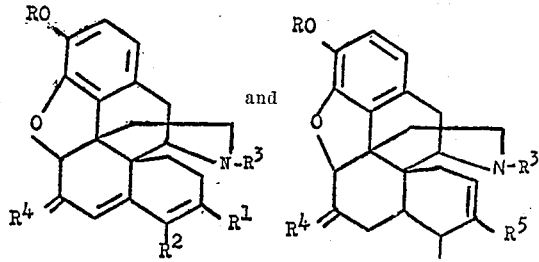

in which

R is hydrogen or methyl, $R^1$ is methyl, ethyl, propyl, phenyl or o-, m- or p-tolyl, $R^2$ is hydrogen, cycloalkyl of 4 to 6 carbon atoms, phenyl, o-, m- or p-tolyl, tetrahydrofurano, alkyl or alkenyl of up to 7 carbon atoms, or such alkyl or alkenyl of up to 7 carbon atoms substituted on any of carbon atoms 1 to 4 by cycloalkyl of 5 to 7 carbon atoms, phenyl, o-, m- or p-tolyl, alkoxy of up to 3 carbon atoms, phenoxy or tetrahydrofurano, provided that $R^2$ is hydrogen only when $R^1$ is phenyl or o-, m- or p-tolyl, $R^3$ is alkyl or alkenyl of up to 8 carbon atoms or cycloalkyl methyl of 4 to 6 carbon atoms, $R^4$ is a single oxygen atom forming part of a carbonyl group or a hydrogen atom and a hydroxy group, and $R^5$ is phenyl, o-, m- or p-tolyl, and salts or bases of the above formulae with pharmaceutically acceptable, non-toxic acids.

2. A codeine or morphine derivative selected from compounds of the formula

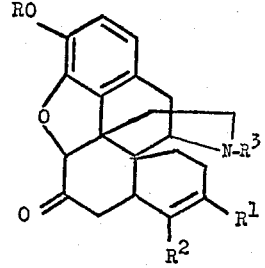

and non-toxic, pharmaceutically acceptable salts thereof in which

R is hydrogen or methyl, $R^1$ is methyl, ethyl, propyl, phenyl or o-, m- or p-tolyl, $R^2$ is hydrogen, cycloalkyl of 4 to 6 carbon atoms, phenyl, o-, m- or p-tolyl, tetrahydrofurano, alkyl or alkenyl of up to 7 carbon atoms, or alkyl or alkenyl of up to 7 carbon atoms substituted on any of carbon atoms 1 to 4 by cycloalkyl of 5 to 7 carbon atoms, phenyl, o-, m- or p-tolyl, alkoxy, phenoxy or tetrahydrofurano, provided that $R^2$ is hydrogen only when $R^1$ is phenyl or o-, m- or p-tolyl, $R^3$ is alkyl or alkenyl of up to 8 carbon atoms, or cycloalkyl methyl of 4 to 6 carbon atoms.

3. A codeine or morphine derivative selected from compounds of the formula

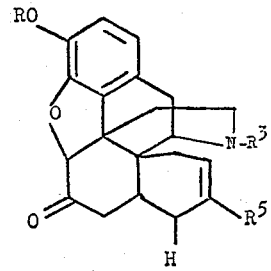

and non-toxic, pharmaceutically acceptable salts thereof in which

R is hydrogen or methyl, $R^3$ is alkyl or alkenyl of up to 8 carbon atoms, or cycloalkyl methyl of 4 to 6 carbon atoms, and $R^5$ is phenyl or o-, m- or p-tolyl.

4. A codeine or morphine derivative selected from compounds of the formula

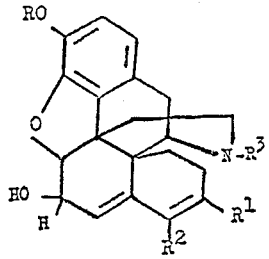

and non-toxic, pharmaceutically acceptable salts thereof in which

R is hydrogen or methyl, $R^1$ is methyl, ethyl, propyl, phenyl or o-, m- or p-tolyl, $R^2$ is hydrogen, cycloalkyl of 4 to 6 carbon atoms, phenyl, o-, m- or p-tolyl, tetrahydrofurano, alkyl or alkenyl of up to 7 carbon atoms, or alkyl or alkenyl of up to 7 carbon atoms substituted on any of carbon atoms 1 to 4 by cycloalkyl of 5 to 7 carbon atoms, phenyl, o-, m- or p-tolyl, alkoxy, phenoxy or tetrahydrofurano, provided that $R^2$ is hydrogen only when $R^1$ is phenyl or o-, m- or p-tolyl, $R^3$ is alkyl or alkenyl of up to 8 carbon atoms, or cycloalkyl methyl of 4 to 6 carbon atoms.

5. A codeine or morphine derivative selected from compounds of the formula

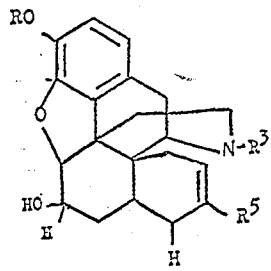

and non-toxic, pharmaceutically acceptable salts thereof in which

R is hydrogen or methyl, $R^3$ is alkyl or alkenyl of up to 8 carbon atoms, or cycloalkyl methyl of 4 to 6 carbon atoms, and $R^5$ is phenyl or o-, m- or p-tolyl.

6. A process for the production of compounds of the formulae

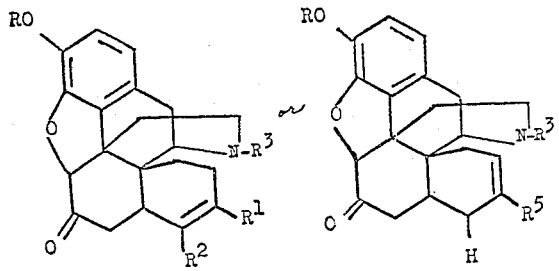

in which

R is hydrogen or methyl, $R^1$ is methyl, ethyl, propyl, phenyl or o-, m- or p-tolyl, $R^2$ is hydrogen, cycloalkyl of 4 to 6 carbon atoms, phenyl, o-, m- or p-tolyl, tetrahydrofurano, alkyl or alkenyl of up to 7 carbon atoms, or alkyl or alkenyl of up to 7 carbon atoms substituted on any of carbon atoms 1 to 4 by cycloalkyl of 5 to 7 carbon atoms, phenyl, o-, m- or p-tolyl, alkoxy, phenoxy or tetrahydrofurano, provided that $R^2$ is hydrogen only when $R^1$ is phenyl or o-, m- or p-tolyl, $R^3$ is alkyl or alkenyl of up to 8 carbon atoms, or cycloalkyl methyl of 4 to 6 carbon atoms, and $R^5$ is phenyl or o-, m- or p-tolyl, which comprises reacting a compound of the formula

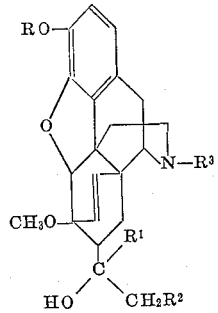

in which R, $R^1$, $R^2$ and $R^3$ have the meanings given above, with more than one molar equivalent 5 to 10 N-hydrochloric acid at a temperature and for a period of time sufficient to bring about rearrangement of the molecule.

7. N - allyl - 7,8-dihydro-3'-ethyl-4'-methylcyclohex-3'-eno(1',2':14,8)-norcodeinone.

8. N - (2 - methylallyl) - 7,8 - dihydro - 3'-n-propyl-4'-methylcyclohex-3'-eno(1',2':14,8)-norcodeinone.

9. N - cyclopropylmethyl - 7,8 - dihydro-3',4'-dimethylcyclohex-3'-eno(1',2':14,8)-norcodeinone.

10. N - cyclobutylmethyl-7,8-dihydro-3'-ethyl-4'-methylcyclohex-3'-eno(1',2':14,8)-norcodeinone.

11. 7,8 - dihydro-4'-phenylcyclohex-4'-eno(1',2':14,8)-codeinone.

References Cited

FOREIGN PATENTS 937,214    9/1963    Great Britain.

ALEX MAZEL, *Primary Examiner.*

DONALD G. DAUS, *Assistant Examiner.*

UNITED STATES PATENT OFFICE
CERTIFICATE OF CORRECTION

Patent No. 3,329,682                                                July 4, 1967

Kenneth W. Bentley

It is certified that error appears in the above identified patent and that said Letters Patent are hereby corrected as shown below:

Column 1, line 46, cancel "about"; line 60, "transquilizing" should read -- tranquilizing --. Column 4, line 2, before "con-" insert an opening parenthesis; lines 4 to 6, insert a closing parenthesis; same column 4, formula (O), insert an arrow from the hydrogen atom bond pointing upward toward the (+). Column 6, between structures S and T add three vertical lines. Column 10, line 48, "$H_{36}$" should read -- $H_{35}$ --. Column 11, line 7, before "1720" insert -- max. --. Column 12, line 44, after "max." insert -- 1725 --; line 74, "(2-hydroxy-5-methyl-2-hexyl)" should read -- (2-hydroxy-2-pentyl) --.

Signed and sealed this 13th day of January 1970.

(SEAL)

Attest:

Edward M. Fletcher, Jr.

Attesting Officer

WILLIAM E. SCHUYLER, JR.

Commissioner of Patents